United States Patent [19]

Ohshita

[11] Patent Number: 5,220,458
[45] Date of Patent: Jun. 15, 1993

[54] KEPLERIAN ZOOMFINDER OPTICAL SYSTEM

[75] Inventor: Koichi Ohshita, Tokyo, Japan

[73] Assignee: Nikon Corporation, Tokyo, Japan

[21] Appl. No.: 896,578

[22] Filed: Jun. 10, 1992

[30] Foreign Application Priority Data

Jun. 26, 1991 [JP] Japan .................................. 3-153621

[51] Int. Cl.$^5$ ...................... G02B 15/14; G03B 13/02; G03B 13/10
[52] U.S. Cl. ................................... 359/689; 354/219; 354/222; 359/676; 359/686; 359/715
[58] Field of Search ............... 359/676, 686, 689, 708, 359/715; 354/219, 222

[56] References Cited

U.S. PATENT DOCUMENTS

| 4,842,395 | 6/1989 | Sato et al. | 359/679 |
| 5,005,955 | 4/1991 | Ohshita | 359/676 |
| 5,086,353 | 2/1992 | Mukai et al. | 359/676 X |

FOREIGN PATENT DOCUMENTS

1-116616 5/1989 Japan .

Primary Examiner—Scott J. Sugarman
Attorney, Agent, or Firm—Shapiro and Shapiro

[57] ABSTRACT

A Keplerian zoom finder system has sequentially from its object side an objective lens with positive refractive power, a field lens with positive refractive power arranged in the vicinity of the focus of the objective lens, and an ocular with positive refractive power for observing the object image by the objective lens in enlargement. In the finder system, the aforesaid objective lens has from its object side the first lens of a biconcave lens with a more enhanced concavity toward the object side and the second lens of a biconvex lens with an aspherical surface on the eye point side. The Keplerian zoom finder system thus structured is characterized in that its finder magnification is varied by varying the air spacing between the aforesaid first lens and second lens and the conditions are satisfied.

9 Claims, 5 Drawing Sheets

KEPLERIAN ZOOMFINDER OPTICAL SYSTEM

BACKGROUND THE INVENTION

1 Field of the Invention

The present invention relates to a view finder optical system for cameras. Especially, the invention relates to a compact and variable magnification Keplerian finder.

2. Related Background Art

In lens shutter cameras, it is also a trend in recent years that those equipped with a phototaking lens having a variable focal length are of the major concern. With this trend, it is required that the finders adopted for such cameras are also capable of performing a continuously variable magnification. Particularly, the Keplerian finders are on demand increasingly for those to be used for high-class cameras because with them, it is possible to divide the field of vision of the finder definitely by the use of its frame therefor and there occurs less ghost or flare. Accordingly, various proposals have been made in recent years regarding the optical system for the Keplerian finder having a variable magnification. Among them, U.S. Pat. No. 4,842,395 and Japanese Patent Laid-Open Application 1-116616 are known, for example.

However, the above-mentioned known finder optical systems still have rooms for improvements in the miniaturization and simplification of its structures. For example, in the embodiment disclosed in the U.S. Pat. No. 4,842,395, if the variation of its magnification (hereinafter referred to as zoom ratio) is as great as approximately 1.8 times, the structure becomes complicated, and if the structure remains to be simple, its zoom ratio cannot be more than 1.5 times, which is not satisfactory in providing a desirable performance. Also, in the Japanese Patent Laid-Open Application 1-116616, a finder optical system having a zoom ratio of substantially more than two times is disclosed. Nevertheless, the disclosed finder is of a considerably complicated structure and a large type, comprising an objective lens of three lens groups of negative, positive, and positive, which makes it difficult to incorporate the system in a miniaturized camera.

SUMMARY OF THE INVENTION

It is therefore an object of the present invention to eliminate the disadvantages of the above-mentioned finders publicly known and provide a finder optical system having the zoom ratio of approximately two times as well as a desirable performance in spite of its miniaturized and simplified structure.

In order to achieve the above-mentioned object, the present invention is of such a structure that in a Keplerian finder optical system having an objective lens with a refractive power, a field lens with a positive refractive power arranged near the focus point of this objective lens, and an ocular with a positive refracting power for observing the enlarged image of an object formed by the objective lens sequentially from the objective side, the above-mentioned objective lens is formed with a negative first lens formed with a biconcave lens having a more intensified concave plane on its objective side and a positive second lens formed with a biconvex lens having an aspherical plane on its eye point side so that the finder magnification can be varied by changing the spatial interval between the above-mentioned first lens and second lens sequentially from the object side. Hence satisfying the conditions given below.

$$-0.24 < r1/r2 < -0.1$$

$$-1.4 < r3/r4 < -0.9$$

$$0.0295 < S4/r4 < 0.0306$$

where
- r1 ... the radius of curvature of the first lens on the object side
- r2 ... the radius of curvature of the first lens on the eye point side
- r3 ... the radius of curvature of the second lens on the object side
- r4 ... the paraxial radius of curvature of the aspherical surface of the second lens on the eye point side
- S4 ... a distance along the optical axis from the contacting plane at the aspherical vertex of the aspherical surface of the second lens on the eye point side to a point on the aspherical surface at the height from the optical axis, $y = 0.25 \cdot r4$ Here, given a distance along the optical axis from the contacting plane at the aspherical vertex of the aspherical surface of the second lens on the eye point side to a point on the aspherical surface at the height y from the optical axis as $S(y)$, the reference radius of curvature as R, the cone coefficient as k, and the n-th aspherical surface coefficient as An, and further, the paraxial radius of curvature r as $r = 1/(2 \cdot A2 + 1/R)$, the aspherical surface can be expressed by an equation given below.

$$S(y) = \frac{y^2/R}{1 + (1 - k \cdot y^2/R^2)^{\frac{1}{2}}} + A2 \cdot y^2 + A4 \cdot y^4 + A6 \cdot y^6 + A8 \cdot y^8 + A10 \cdot y^{10}$$

Further, it is desirable to structure the first lens and second lens to satisfy the following condition in order to correct its chromatic aberration desirably.

$$16 < \nu2 - \nu1 < 24$$

where,
- $\nu1$: the Abbe number for the first lens of the objective lens
- $\nu2$: the Abbe number for the second lens of the objective lens.

In a finder according to the present invention as described above, the objective lens is simply structured by the two group-two pieces comprising the first lens formed with a biconcave lens having a more intensified concave plane toward the object side and the second lens formed with a biconvex lens having an aspherical surface on the eye point side. Then, at the same time, in order to maintain a desirable state of the aberration correction according to the present invention, the curvature of the first lens of the biconcave shape on the object side is firstly more intensified than that on the image plane side to obtain an effect to restrain the spherical aberration and coma occurring in the first lens and an effect to cancel out the astigmatism occurring in the second lens and field lens simultaneously. Subsequently, by shaping the second lens biconvex, the spherical aberration occurring in the second lens is restrained, and further, its plane on the eye point side is made aspherical in order to correct coma in a better condition. Also, the chromatic aberration is corrected desirably by making the chromatic dispersion of the first lens greater than that of the second lens.

The above-mentioned and other objects, features and advantages of the present invention will become more apparent by reference to the detailed description set forth below in conjunction with the accompanying drawings.

DETAILED DESCRIPTION OF THE PREFERRED EMBODIMENTS

Hereinafter, in reference to the accompanying drawings, the detailed description will be made of embodiments according to the present invention.

FIGS. 1A to 1C through FIGS. 5A to 5C are views showing the optical structures of a first through fifth embodiments according to the present invention, respectively, and FIGS. 1A, 2A, 3A, 4A, and 5A represent its state at the wide angle end; FIGS. 1B, 2B, 3B, 4B, and 5B, in the middle position; and FIGS. 1C, 2C, 3C, 4C, and 5C, at the telephotographic or narrow angle end.

Figure 1A:
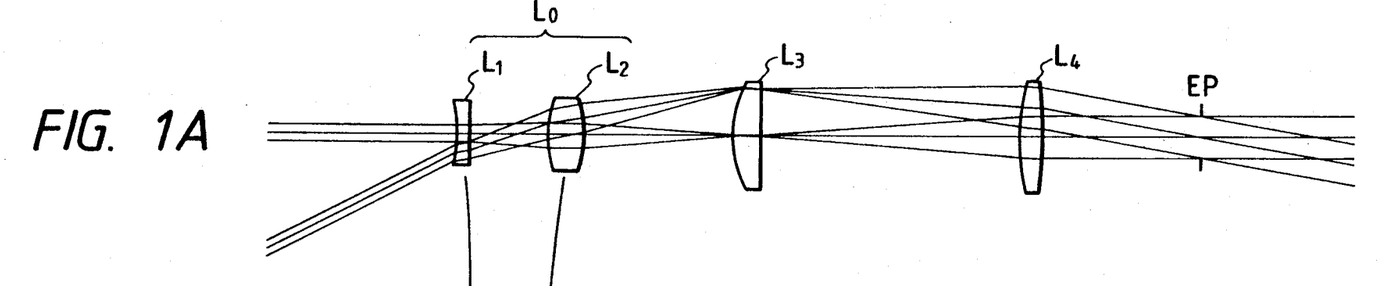
FIG. 1A through FIG. 1C are views schematically showing the optical structure of the optical system arrangement and optical path in a first embodiment according to the present invention.
Figure 1B:
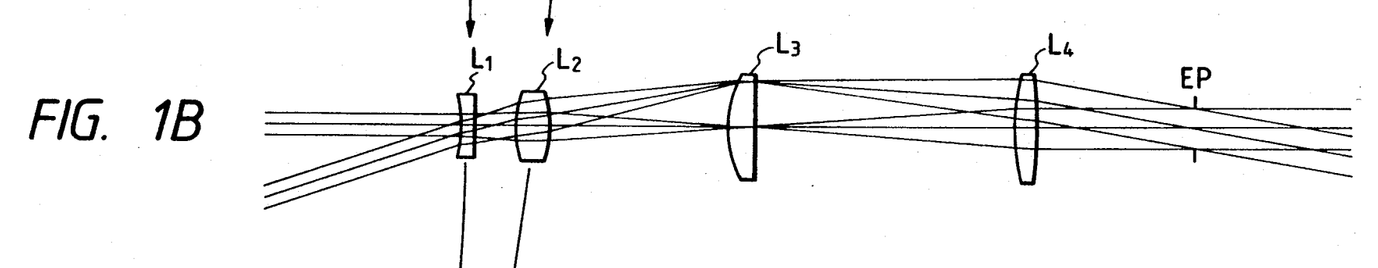
Figure 1C:
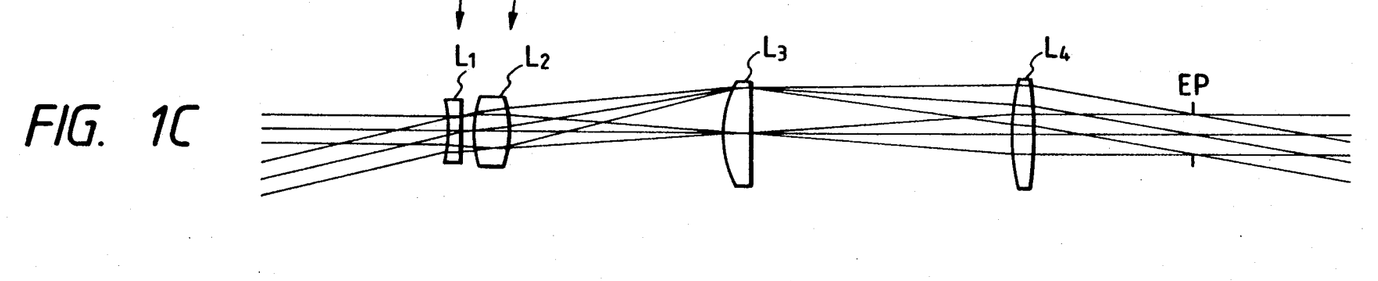
Figure 2A:
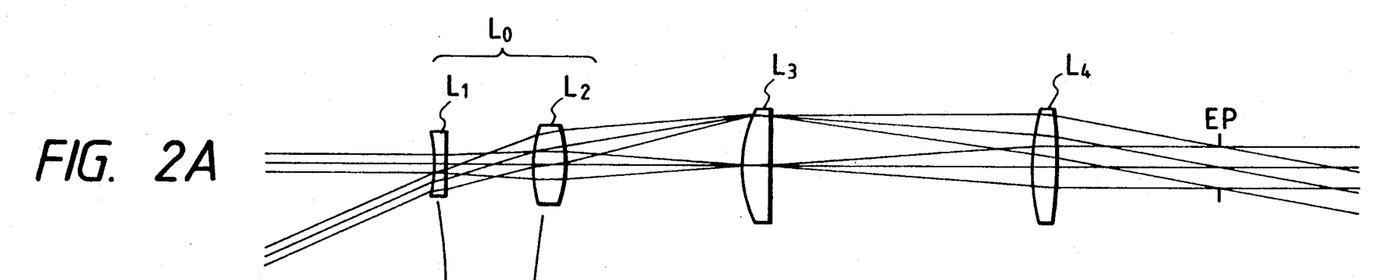
FIG. 2A through FIG. 2C are views schematically showing the optical structure of the optical system arrangement and optical path in a second embodiment according to the present invention.
Figure 2B:
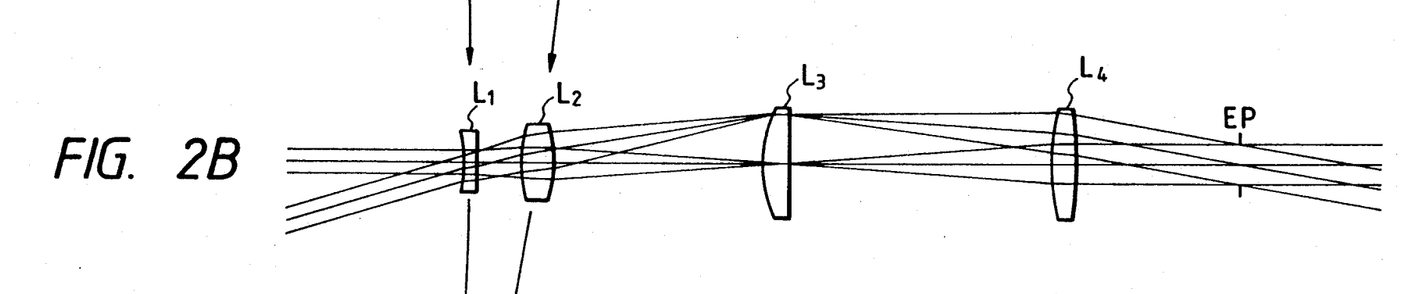
Figure 2C:
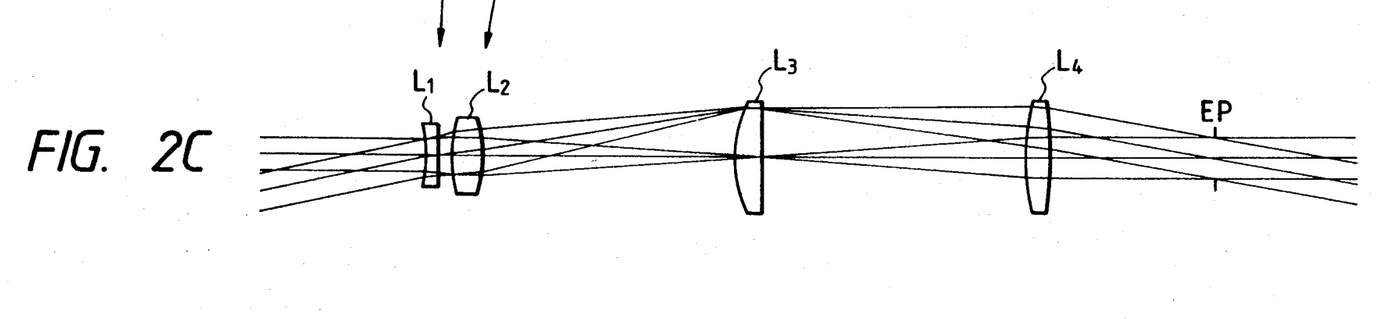
Figure 3A:
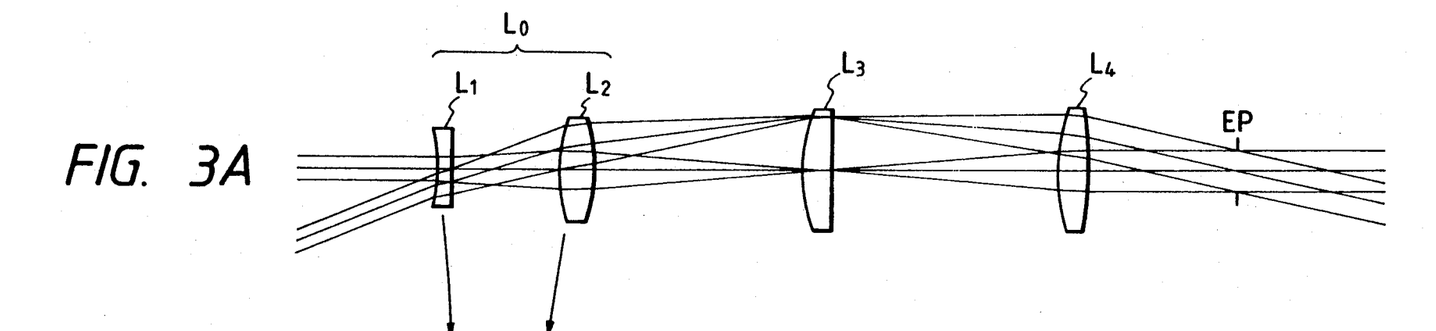
FIG. 3A through FIG. 3C are views schematically showing the optical structure of the optical system arrangement and optical path in a third embodiment according to the present invention.
Figure 3B:
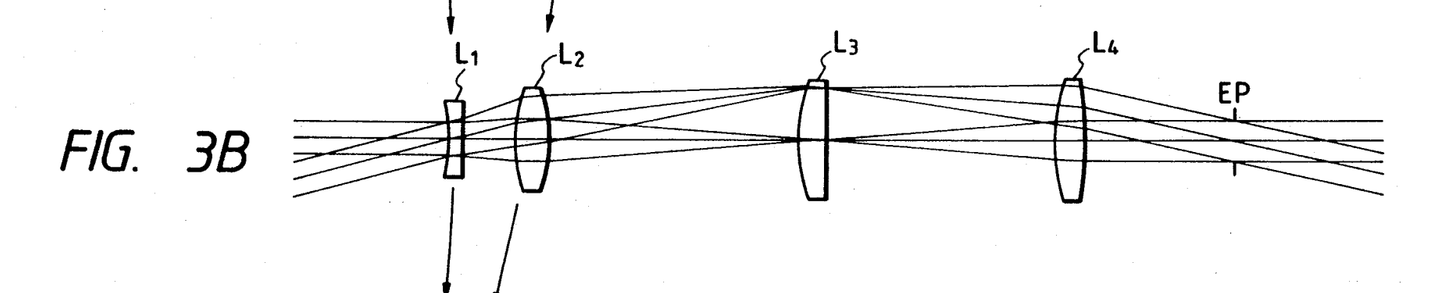
Figure 3C:
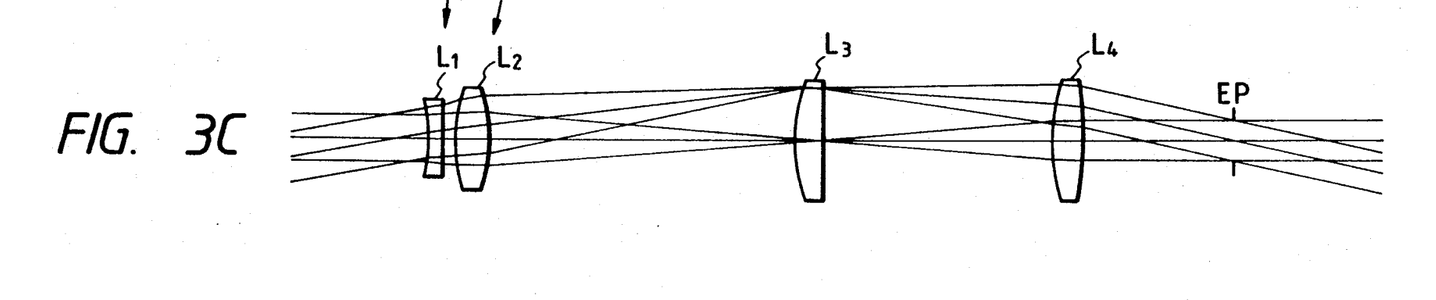
Figure 4A:
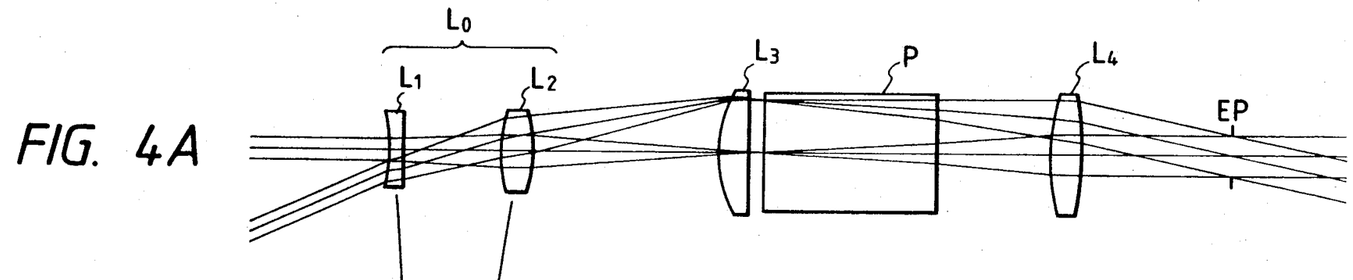
FIG. 4A through FIG. 4C are views schematically showing the optical structure of the optical system arrangement and optical path in a fourth embodiment according to the present invention.
Figure 4B:
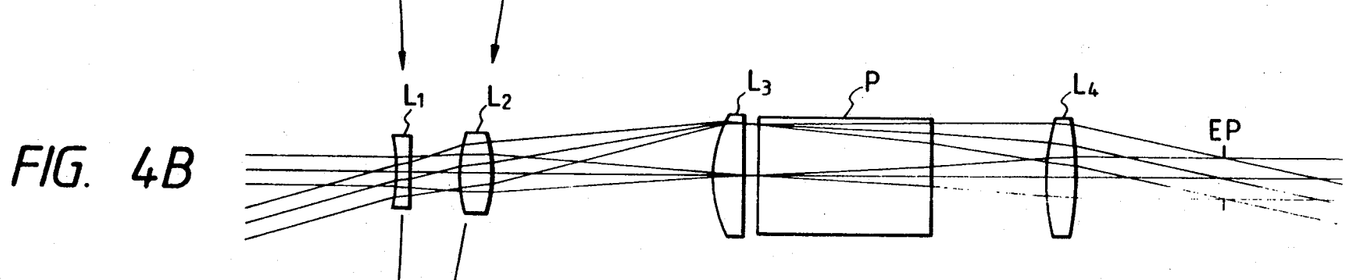
Figure 4C:
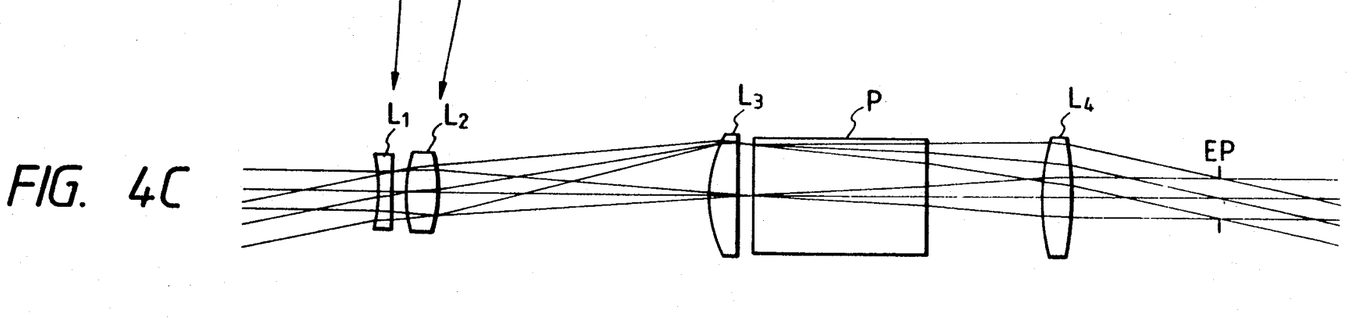
Figure 5A:
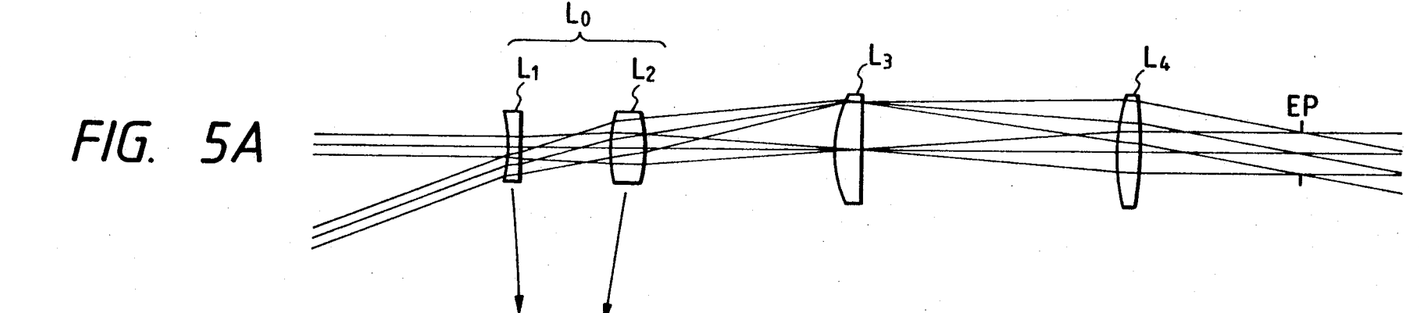
FIG. 5A through FIG. 5C are views schematically showing the optical structure of the optical system arrangement and optical path in a fifth embodiment according to the present invention.
Figure 5B:
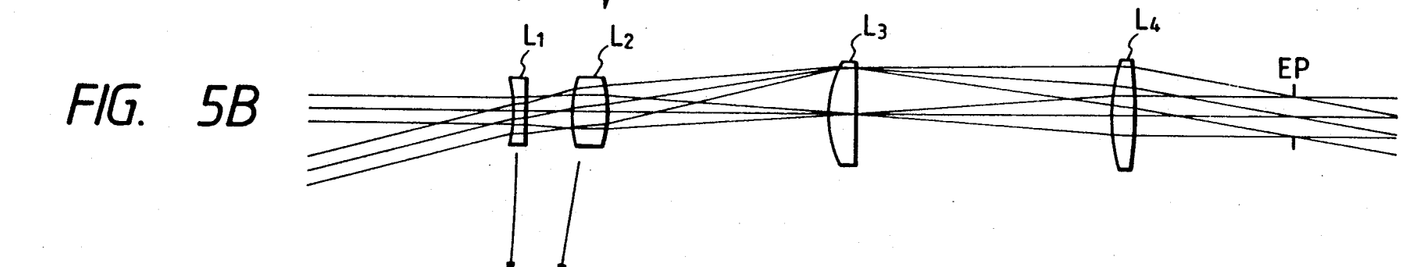
Figure 5C:
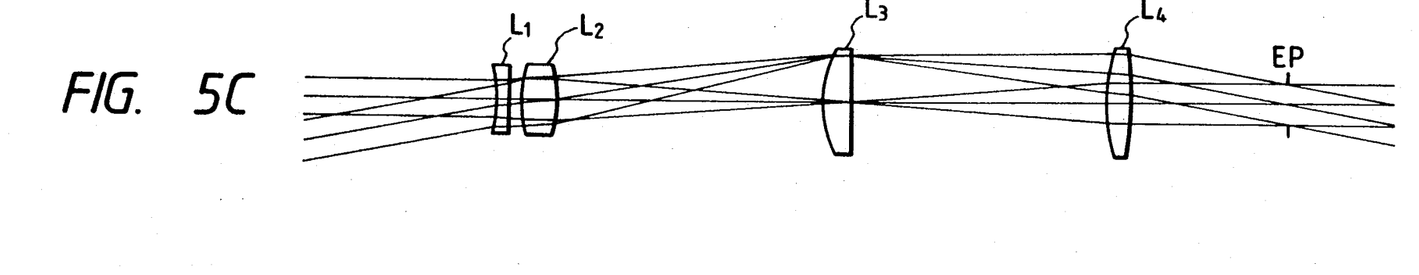

In each of the embodiments, as shown in FIGS. 1A to 5A through FIGS. 5A to 5C, respectively, the structure are arranged in such a manner that there are provided sequentially from the object side an objective lens L0 having a positive refractive power and comprising a negative biconcave lens L1 with a more intensified concave plane on the object side, and a positive biconvex lens L2 with an aspherical surface on the eye point (EP) side, a field lens L3 which is a positive flat convex lens provided near the focus point of the objective lens with its convex plane on the object side, and an ocular L4 which is a positive biconvex single lens with an aspherical surface on the object side. In this respect, the inverted image which is formed by the objective lens L0 is converted into its normal image by the four reflecting surface (not shown) arranged between the second lens L2 and the ocular L4. However, for the reflecting surface according to a fourth embodiment, a prism P is partially employed as shown in FIG. 4. In all other embodiments, a surface mirror is used for providing the reflecting plane.

In a finder structured according to the present invention described as above, it is necessary to achieve desirable correction by aberration by coupling each of the lenses systematically in order to offset the occurring aberrations with each other. In the present invention, therefore, the following conditional expressions (1) to (3) to keep this balance for the implementation of a desirable aberration correction:

$$-0.24 < r1/r2 < -0.1 \tag{1}$$

$$-1.4 < r3/r4 < -0.9 \tag{2}$$

$$0.0295 < S4/r4 < 0.0306 \tag{3}$$

where
- r1: the radius of curvature of the first lens L1 of the objective lens L0 on the object side.
- r2: the radius of curvature of the first lens L1 on the eye point side.
- r3: the radius of curvature of the second lens L2 of the objective lens L0 on the object side.
- r4: the paraxial radius of curvature of the aspherical surface of the second lens L2 on the eye point side.
- S4: a distance along the optical axis from the contacting plane at the aspherical vertex of the second lens L2 of the objective lens L0 on the eye point side to a point on the aspherical surface at the height from the optical axis, y=0.25·r4.

Here, given a distance along the optical axis from the contacting plane at the aspherical vertex of the aspherical surface of the second lens on the eye point side to a point on the aspherical surface at the height y from the optical axis as S(y), the reference radius of curvature as R, the cone coefficient as k, and the n-th aspherical surface coefficient as An, and further, the paraxial radius of curvature r as r=1/(2·A2+1/R), the aspherical surface can be expressed by an equation (a) given below.

$$S(y) = \frac{y^2/R}{1 + (1 - k \cdot y^2/R^2)^{\frac{1}{2}}} + \tag{a}$$

$$A2 \cdot y^2 + A4 \cdot y^4 + A6 \cdot y^6 + A8 \cdot y^8 + A10 \cdot y^{10}$$

The above-mentioned conditional expression (1) is established for the purpose of a desirable correction of the distortion and comatic aberration by regulating the shape of the first lens L1. Beyond the upper limit of this expression, it becomes difficult to correct any negative distortion at the wise angle end. On the contrary, beyond the lower limit of this expression, it becomes difficult to correct any coma, leading to the degradation of the performance off the axis. If the lower limit of this expression (1) is −0.22, better correction of distortion and coma can be performed, which is preferable.

The condition expression (2) relates to the one regarding the correction of spherical aberration. In order to implement the miniaturization of a finder, there is a need for intensifying the refractive power for each of the lenses. Particularly, the refractive power of the second lens L2 must be intensified. However, it is necessary to make the light beam passing through the second lens L2 relatively larger for keeping the required pupil diameter unchanged at the eye point, making it difficult to correct the spherical aberration. Therefore, it is desirable to form the shape of the second lens L2 as close as to a shape thereby to allow the spherical aberration to be minimized so that the conditional expression (2) can be satisfied. Beyond the upper limit of the expression (2) and the lower limit as well, it becomes difficult to restrain the fluctuation of the spherical aberration when the variable magnification is performed. Further, beyond the lower limit, it is difficult to correct coma at the wide angle end and to restrain the fluctuation of astigmatism beyond the upper limit.

The conditional expression (3) regulates the aspherical surface of the second lens L2 on the eye point side. Beyond the upper limit of this expression (3), the effect of the aspherical surface becomes insufficient to make it difficult to restrain the fluctuation of the spherical aberration and coma. Also, beyond the lower limit, the effect of the aspherical surface becomes excessively great, which is not preferable because this will, on the contrary, promote the the fluctuation of the aberration.

Also, it is desirable to structure the objective lens L0 in a finder according to the present invention to satisfy the above-mentioned conditional expressions (1) to (3) and further the conditions given below.

$$16 < \nu2 - \nu1 < 24 \tag{4}$$

where, $\nu1$: the Abbe number of the first lens L1 of the objective lens L0

$\nu2$: The Abbe number of the second lens L2 of the objective lens L0

The conditional expression (4) is the one related to the correction of chromatic aberration. As represented in the conditional expression (2), the aberration which makes its correction difficult when a miniaturization is attempted by intensifying the refractive power of the lens is a spherical aberration and a chromatic aberration on the axis which is another one to be taken into account. In general, for the correction of the chromatic aberration on the axis, it suffices if each lens, particularly the second lens L2, is formed as a cemented lens which is achomatized. However, this results in an increased lens number, leading to another difficulty in simplifying the structure. Therefore, in the present invention, the structure is arranged so that the chromatic dispersion of the first lens L1 having negative refractive power is made greater than that of the second lens L2 having positive refractive power to offset the chromatic aberration on the axis with each other. Nevertheless, beyond the limit provided by this method, the first lens L1 contributes greatly to the light outside the axis at the wide angle end, and there is a fear that the chromatic deviation in the circumference of the field at the wide angle end, that is, the lateral chromatic aberration, is greatly expanded. It is therefore desirable to arrange the structure so that the Abbe numbers of the first lens L1 and second lens L2 can remain within the range provided by the conditional expression (4).

Beyond the lower limit of this conditional expression (4), the correction cannot be made sufficiently for the chromatic aberration on the axis cannot be made at the narrow angle end while beyond the upper limit, the lateral chromatic aberration is great at the wide angle end, which is not desirable.

Moreover, in the structure according to the present invention as arranged above, it is preferable to restrict the occurrence of aberration by offsetting the negative distortion occurring in the first lens L1 on the objective side by forming the field lens L3 to be a shape of a flat convex lens having its convex plane on the object side and further, by making the ocular L4 a biconvex shape in order to allow it to share the refractive power appropriately with its plane on both sides.

More specifically, in this respect, when the first lens L1 and second lens L2 of the objective lens L0 move from the wide angle end to the narrow angle end, the second lens L2 is shifted toward the object side along the optical axis and at the same time, the first lens L1 is shifted toward the object side on the U turn path of the concavity. In this way, it is possible to obtain a continuous variation of the magnification from the lower magnification to the higher magnification.

Further, in order to make both miniaturization and a desirable correction of aberrations possible at a time, the objective lens L0 and field lens L3 should desirably be capable of satisfying the conditions (5) to (7) given below. Also, the ocular L4 should desirably be able to satisfy the conditions (8) and (9) given below.

$$|1 + f1/(fw \cdot ft)^{\frac{1}{2}}| < 0.03 \tag{5}$$

$$-1.5 < f1/fw < -1.3 \tag{6}$$

$$1.6 < f3/f2 < 2.2 \tag{7}$$

$$-0.8 < r7/r8 < -0.3 \tag{8}$$

$$0.03 < S7/r7 < 0.0313 \tag{9}$$

where, f1: the focal length of the first lens L1 of the objective lens L0.

f2: the focal length of the second lens L2 of the objective lens L0.

f3: the focal length of the field lens L3.

fw: the synthesized focal length of the first lens L1 and the second lens L2 at the wide angle side.

ft: the synthesized focal length of the first lens L1 and the second lens L2 at the narrow angle side.

r7: the paraxial radius of curvature of the aspherical surface of the ocular L4 on the object side.

r8: the radius of curvature of the ocular L4 on the eye point (EP) side.

S7: a distance along the optical axis from the contacting plane at the vertex of the point of the aspherical surface of the ocular L4 on the object side at a height, y=0.25·r7, from the optical axis.

In this respect, the plane of the ocular L4 on the object side is structured to be aspherical. This aspherical surface can also be represented by the aforesaid expression (a).

The conditional expression (5) is intended to implement the miniaturization of the finder by regulating the magnification of the second lens L2 indirectly. Generally, a finder is incorporated in the body of a camera. It is therefore conceivable that the size of a variable magnification finder is defined by the maximum total length which can be varied between the narrow angle end and wide angle end. Because of this, even when a finder can be of an extremely compact at its wide angle side, for example, such a compactness cannot be utilized at its narrow angle end if the finder is structured so that the total length is extended at the narrow angle end. Likewise, on the contrary, even when a finder is arranged to be compact at its narrow angle end, such compactness cannot be utilized at its wide angle end if the total length is extended at the wide angle end. Therefore, for such a finder as the present invention which maximize the total length either at the narrow angle end or wide angle end, it is conceivable that the substantial total length of the finder becomes minimum when the total length is almost equal at its narrow angle end and wide angle end. The conditional expression (5) means that the magnification of the second lens L2 becomes almost an equal magnification between the wide angle end and narrow angle end, and beyond the upper limit thereof, the difference between the total lengths at the wide angle end and narrow angle end becomes too large, making it difficult to implement the miniaturization.

The conditional expression (6) regulates the focal length of the first lens L1. Beyond the upper limit thereof, it becomes difficult to adopt a large zoom ratio and beyond the lower limit, it becomes difficult to implement a miniaturization.

The conditional expression (7) regulates the focal length of the third lens L3 which is a field lens. Beyond the lower limit of this conditional expression, the focal length of the field lens L3 becomes too short with the result that the eye point also becomes short to make an observation through the finder rather difficult. On the contrary, beyond the upper limit thereof, the eye point becomes unnecessarily long to invite the necessity of a large-sized finder.

The conditional expression (8) regualtes the shape of the ocular L4. Beyond the upper limit of this expression, the generation of the spherical aberration becomes conspicuous, and beyond the lower limit thereof, it becomes difficult to correct astigmatism. Hence tending to deteriorate its fringe performance.

The conditional expression (9) regulates the shape of the aspherical surface of the ocular L4 on the object side. Beyond the upper limit of this expression, the effect of the aspherical surface becomes insufficient to make the correction of coma difficult. On the contrary, beyond the lower limit thereof, the effect of the aspherical surface becomes too great, resulting in the aggravated astigmatism.

Hereinafter, all the numerical data of each of the embodiments according to the present invention will be listed. The number at the left-hand side designates the lens surface numbers; r, the radius of curvature; d, the distance between lens surfaces; N, the refractive index with respect to d-line ($\lambda = 587.6$ nm); $\nu$, Abbe number; X, diopter; m, magnification; $\omega$, an angle of incidence; and h', the radius of pupil at an eye point. Also, the aspherical surface is represented with a mark * attached to the lens surface number.

TABLE 1

[First Embodiment]
X = −0.70D  m = 0.39∼0.70x
2ω = 52.5°∼26.7°
h' = 2.0

| | r | d | $\nu$ | N |
|---|---|---|---|---|
| 1) | −10.5020 | 1.200 | 35.09 | 1.574100 |
| 2) | 53.7614 | D1 | | 1.000000 |
| 3) | 9.8418 | 3.600 | 57.57 | 1.491080 |
| 4)* | −9.7187 | D2 | | 1.000000 |
| 5) | 10.8038 | 2.800 | 57.57 | 1.491080 |
| 6) | ∞ | 25.800 | | 1.000000 |
| 7)* | 19.0180 | 2.300 | 57.57 | 1.491080 |
| 8) | −41.0030 | 16.000 | | 1.000000 |
| 9> | (EP) | | | 1.000000 |

Fourth surface (Aspherical surface)
Cone Coefficient: K = −3.29
Aspherical coefficient: A8 = 5.4214 × 10$^{-7}$,
A10 = −4.0767 × 10$^{-9}$
Seventh surface (Aspherical surface)
Cone coefficient: K = −0.46
Aspherical coefficient: A8 = −5.000 × 10$^{-10}$,
A10 = 0.00
(Variable spacing)

| m | 0.387 | 0.522 | 0.704 |
|---|---|---|---|

TABLE 1-continued

[First Embodiment]
X = −0.70D  m = 0.39∼0.70x
2ω = 52.5°∼26.7°
h' = 2.0

| D1 | 7.781 | 4.075 | 1.333 |
|---|---|---|---|
| D2 | 15.123 | 17.868 | 21.566 |

Values corresponding to the conditions of the above-mentioned first embodiment are as follows:
(1) r1/r2 = −0.1953
(2) r3/r4 = −1.013
(3) S4/r4 = 0.02973
(4) $\nu$2 − $\nu$1 = 22.5
(5) |1 + f1/(fw · ft)$^{\frac{1}{2}}$| = −1.000
(6) f1/fw = −1.350
(7) f3/f2 = 2.075
(8) r7/r8 = −0.464
(9) S7/r7 = 0.03102

TABLE 2

[Second Embodiment]
X = −0.70D  m = 0.44∼0.81x
2ω = 46.9°∼24.1°
h' = 2.0

| | r | d | $\nu$ | N |
|---|---|---|---|---|
| 1) | −11.4410 | 1.200 | 35.09 | 1.574100 |
| 2) | 87.6421 | D1 | | 1.000000 |
| 3) | 12.5692 | 3.300 | 57.57 | 1.491080 |
| 4)* | −10.1352 | D2 | | 1.000000 |
| 5) | 12.0000 | 2.700 | 57.57 | 1.491080 |
| 6) | ∞ | 26.400 | | 1.000000 |
| 7)* | 19.2600 | 2.500 | 57.57 | 1.491080 |
| 8) | −43.0000 | 16.000 | | 1.000000 |
| 9> | (EP) | | | 1.000000 |

Fourth surface (Aspherical surface)
Cone coefficient: K = −1.96
Aspherical coefficient: A8 = 3.4747 × 10$^{-7}$,
A10 = −1.2407 × 10$^{-8}$
Seventh surface (Aspherical surface)
Cone coefficient: K = −0.40
Aspherical coefficient: A8 = −5.000 × 10$^{-10}$,
A10 = 0.0000
(Variable spacing)

| m | 0.440 | 0.594 | 0.807 |
|---|---|---|---|
| D1 | 8.741 | 4.528 | 1.355 |
| D2 | 17.868 | 20.970 | 25.253 |

Values corresponding to the conditions of the above-mentioned second embodiment are as follows:
(1) r1/r2 = −0.1305
(2) r3/r4 = −1.240
(3) S4/r4 = 0.03030
(4) $\nu$2 − $\nu$1 = 22.5
(5) |1 + f1/(fw · ft)$^{\frac{1}{2}}$| = −1.000
(6) f1/fw = −1.354
(7) f3/f2 = 2.036
(8) r7/r8 = −0.448
(9) S7/r7 = 0.03105

TABLE 3

[Third Embodiment]
X = −1.00D  m = 0.58∼1.14x
2ω = 43.1°∼20.9°
h' = 2.0

| | r | d | $\nu$ | N |
|---|---|---|---|---|
| 1) | −14.2300 | 1.400 | 35.09 | 1.574100 |
| 2) | 84.3669 | D1 | | 1.000000 |
| 3) | 15.3119 | 3.500 | 57.57 | 1.491080 |
| 4)* | −11.9950 | D2 | | 1.000000 |
| 5) | 15.0000 | 3.000 | 57.57 | 1.491080 |
| 6) | ∞ | 23.000 | | 1.000000 |
| 7)* | 19.0020 | 3.000 | 57.57 | 1.491080 |
| 8) | −30.0000 | 15.000 | | 1.000000 |
| 9> | (EP) | | | 1.000000 |

Fourth surface (Aspherical surface)
Cone coefficient: K = −1.78

TABLE 3-continued

[Third Embodiment]

$X = -1.00D \quad m = 0.58 \sim 1.14x$
$2\omega = 43.1° \sim 20.9°$
$h' = 2.0$

Aspherical coefficient: $A8 = 5.1555 \times 10^{-8}$,
$A10 = -6.0409 \times 10^{-10}$
Seventh surface (Aspherical surface)
Cone coefficient: $K = -1.10$
Aspherical coefficient: $A8 = -4.000 \times 10^{-10}$,
$A10 = 0.0000$ (Variable spacing)

| m | 0.584 | 0.813 | 1.142 |
|---|---|---|---|
| D1 | 11.060 | 5.420 | 1.284 |
| D2 | 21.068 | 25.087 | 30.857 |

Values corresponding to the conditions of the above-mentioned third embodiment are as follows:
(1) $r1/r2 = -0.1687$
(2) $r3/r4 = -1.277$
(3) $S4/r4 = 0.03040$
(4) $\nu2 - \nu1 = 22.5$
(5) $|1 + f1/(fw \cdot ft)^{\frac{1}{2}}| = -0.999$
(6) $f1/fw = -1.398$
(7) $f3/f2 = 2.136$
(8) $r7/r8 = -0.633$
(9) $S7/r7 = 0.03073$

TABLE 4

[Fourth Embodiment]

$X = -1.00D \quad m = 0.52 \sim 0.96x$
$2\omega = 46.6° \sim 23.7°$
$h' = 2.0$

| | r | d | ν | N |
|---|---|---|---|---|
| 1) | −13.5816 | 1.300 | 35.09 | 1.574100 |
| 2) | 82.1266 | D1 | | 1.000000 |
| 3) | 13.7483 | 3.300 | 57.57 | 1.491080 |
| 4)* | −11.9613 | D2 | | 1.000000 |
| 5) | 12.1020 | 2.900 | 57.57 | 1.491080 |
| 6) | ∞ | 1.500 | | 1.000000 |
| 7) | ∞ | 17.400 | 57.57 | 1.491080 |
| 8) | ∞ | 11.600 | | 1.000000 |
| 9)* | 20.4700 | 3.000 | 57.57 | 1.491080 |
| 10) | −29.0090 | 15.000 | | 1.000000 |
| 11> | (EP) | | | 1.000000 |

Fourth surface (Aspherical surface)
Cone efficient: $K = -2.41$
Aspherical coefficient: $A8 = -5.4379 \times 10^{-8}$,
$A10 = 6.5121 \times 10^{-9}$
Ninth surface (Aspherical surface)
Cone coefficient: $K = -1.30$
Aspherical coefficient: $A8 = -6.000 \times 10^{-10}$,
$A10 = 0.0000$ (Variable spacing)

| m | 0.522 | 0.708 | 0.963 |
|---|---|---|---|
| D1 | 9.951 | 5.090 | 1.482 |
| D2 | 18.790 | 22.357 | 27.242 |

Values corresponding to the conditions of the above-mentioned fourth embodiment are as follows:
(1) $r1/r2 = -0.1654$
(2) $r3/r4 = -1.149$
(3) $S4/r4 = 0.03015$
(4) $\nu2 - \nu1 = 22.5$
(5) $|1 + f1/(fw \cdot ft)^{\frac{1}{2}}| = -1.001$
(6) $f1/fw = -1.360$
(7) $f3/f2 = 1.812$
(8) $r7/r8 = -0.706$
(9) $S7/r7 = 0.03063$

TABLE 5

[Fifth Embodiment]

$X = -0.70D \quad m = 0.48 \sim 0.88x$
$2\infty = 40.7° \sim 21.4°$
$h' = 2.0$

| | r | d | ν | N |
|---|---|---|---|---|
| 1) | −12.9000 | 1.200 | 35.09 | 1.574100 |
| 2) | 70.3776 | D1 | | 1.000000 |
| 3) | 12.6255 | 3.600 | 57.57 | 1.491080 |
| 4)* | −11.2548 | D2 | | 1.000000 |
| 5) | 11.4000 | 2.700 | 57.57 | 1.491080 |
| 6) | ∞ | 25.800 | | 1.000000 |
| 7)* | 19.0180 | 2.300 | 57.57 | 1.491080 |
| 8) | −41.0030 | 16.000 | | 1.000000 |
| 9> | (EP) | | | 1.000000 |

Fourth surface (Aspherical surface)
Cone coefficient: $K = -2.65$
Aspherical coefficient: $A8 = -1.4065 \times 10^{-7}$,
$A10 = 1.7322 \times 10^{-8}$
Seventh surface (Aspherical surface)
Cone efficient: $K = -0.46$
Aspherical coefficient: $A8 = -5.000 \times 10^{-10}$,
$A10 = 0.0000$ (Variable spacing)

| m | 0.485 | 0.654 | 0.883 |
|---|---|---|---|
| D1 | 9.090 | 4.638 | 1.325 |
| D2 | 19.032 | 22.326 | 26.792 |

Values corresponding to the conditions of the above-mentioned fifth embodiment are as follows:
(1) $r1/r2 = -0.1833$
(2) $r3/r4 = -1.122$
(3) $S4/r4 = 0.03005$
(4) $\nu2 - \nu1 = 22.5$
(5) $|1 + f1/(fw \cdot ft)^{\frac{1}{2}}| = -1.000$
(6) $f1/fw = -1.350$
(7) $f3/f2 = 1.821$
(8) $r7/r8 = -0.464$
(9) $S7/r7 = 0.03102$ It is needless to mention that the aberration of each of the above-mentioned embodiments 1 to 5 has been desirably corrected.

As described above, according to the present invention, it is possible to obtain a Keplerian zoom finder with various aberrations having been desirably corrected as well as with a zoom ratio of approximately two times in spite of its simple and compact structure.

What is claimed is:

1. A Keplerian zoom finder optical system comprising sequentially from the object side:

an objective lens having a positive refractive power and consisting of a negative first lens of a biconcave shape having a more enhanced concavity on its object side, and a positive second lens of a biconvex shape with its eye point side being formed to be an aspherical surface;

a field lens arranged in the vicinity of the focus of said objective lens, and having a positive refractive power; and an ocular with a positive refractive power for observing the enlarged image of an object formed by said objective lens, wherein said first lens and said second lens can move relatively in the direction of the optical axis to vary the lens spacing for the variations of the finder magnification, and are structured to satisfy the conditions given below:

$-0.24 < r1/r2 < -0.1$ $-1.4 < r3/r4 < -0.9$ $0.0295 < S4/r4 < 0.0306$ where r1 ... the radius of curvature of the first lens (on its surface) on the object side r2 ... the radius of curvature of the first lens (on its surface) on the eye point side r3 ... the radius of curvature of the second lens in the objective lens (on its surface) on the object side r4 ... the paraxial radius of curvature of the aspherical surface of the second lens on the eye point side S4 ... a distance along the optical axis from the contacting plane at the aspherical vertex of the aspherical surface of the second lens on the eye point side to a point on the aspherical surface at the height from the optical axis, y=0.25·r4, given a distance along the optical axis from the contacting plane at the aspherical vertex of the aspherical surface to a point on the aspherical surface at the height y from the optical axis as S(y), the reference radius of curvature as R, the cone coefficient as k, and the nth aspherical surface coefficient as An, and further, the paraxial radius of curvature r as $r=1/(2 \cdot A2 + 1/R)$, the aspherical surface of said second lens can be expressed by an equation given below:

$$S(y) = \frac{y^2/R}{1 + (1 - k \cdot y^2/R^2)^{\frac{1}{2}}} +$$

$$A2 \cdot y^2 + A4 \cdot y^4 + A6 \cdot y^6 + A8 \cdot y^8 + A10 \cdot y^{10}.$$

2. A Keplerian Zoom finder optical system according to claim 1, wherein said first lens and said second lens are structured to satisfy further the conditions given below:

$$16 < \nu2 - \nu1 < 24$$

where

ν1: the Abbe number for the first lens,

μ2: the Abbe number for the second lens.

3. A Keplerian Zoom finder optical system according to claim 1, wherein said first and second lenses in said objective lens and said field lens are structured to satisfy the conditions given below where the focal length of said first lens is f1, the focal length of said second lens, f2, and the focal length of said field lens, f3:

$$|1 + f1/(fw \cdot ft)^{\frac{1}{2}}| < 0.03$$

$$-1.5 < f1/fw < -1.3$$

$$1.6 < f3/f2 < 2.2$$

where fw: the combined focal length of the first lens and second lens at the wide angle side, ft: the combined focal length of the first lens and second lens at the narrow angle side.

4. A Keplerian Zoom finder optical system according to claim 1, wherein said ocular is a biconvex lens having a surface formed aspherically on the object side and is structured to satisfy the conditions given below:

$$-0.8 < r7/r8 < -0.3$$

$$0.03 < S7/r7 < 0.0313$$

where, r7: the radius of the paraxial curvature of the aspherical surface of the ocular on the object side, r8: the radius of the curvature (of the surface) of the ocular on the eye point side, S7: a distance along the optical axis from the contacting plane at the vertex of the point of the aspherical surface of the ocular on the object side at a height, y=0.25·r7, from the optical axis, given a distance along the optical axis from the contacting plane at the aspherical vertex of the aspherical surface to a point on the aspherical surface at the height y from the optical axis as S(y), the reference radius of curvature as R, the cone coefficient as k, and the nth aspherical coefficient as An, and further, the paraxial radius of curvature r as $r=1/(2 \cdot A2 + 1/R)$, the aspherical surface of said ocular can be expressed by an equation given below:

$$S(y) = \frac{y^2/R}{1 + (1 - k \cdot y^2/R^2)^{\frac{1}{2}}} +$$

$$A2 \cdot y^2 + A4 \cdot y^4 + A6 \cdot y^6 + A8 \cdot y^8 + A10 \cdot y^{10}.$$

5. A Keplerian Zoom finder optical system according to claim 1, wherein said zoom finder optical system is structured in accordance with the data listed in the table give below:

| X = −0.70D  m = 0.39∼0.70x 2ω = 52.5°∼26.7° h' = 2.0 | | | |
|---|---|---|---|
| r | d | ν | N |
| 1) −10.5020 | 1.200 | 35.09 | 1.574100 |
| 2) 53.7614 | D1 | | 1.000000 |
| 3) 9.8418 | 3.600 | 57.57 | 1.491080 |
| 4)* −9.7187 | D2 | | 1.000000 |
| 5) 10.8038 | 2.800 | 57.57 | 1.491080 |
| 6) ∞ | 25.800 | | 1.000000 |
| 7)* 19.0180 | 2.300 | 57.57 | 1.491080 |
| 8) −41.0030 | 16.000 | | 1.000000 |
| 9> (EP) | | | 1.000000 |
| Fourth surface (Aspherical surface) Cone coefficient: K = −3.29 Aspherical coefficient: A8 = 5.4214 × 10⁻⁷, A10 = −4.0767 × 10⁻⁹ Seventh surface (Aspherical surface) Cone coefficient: K = −0.46 Aspherical coefficient: A8 = −5.000 × 10⁻¹⁰, A10 = 0.00 | | | |
| (Variable spacing) | | | |
| m  0.387 | 0.522 | 0.704 | |
| D1  7.781 | 4.075 | 1.333 | |
| D2  15.123 | 17.868 | 21.566 | |
| (1) r1/r2 = −0.1953 (2) r3/f4 = −1.013 (3) S4/r4 = 0.02973 (4) ν2 − ν1 = 22.5 (5) \|1 + f1/(fw · ft)^½\| = −1.000 (6) f1/fw = −1.350 (7) f3/f2 = 2.075 (8) r7/r8 = −0.464 (9) S7/r7 = 0.03102 | | | | where, on the above-mentioned itemized table, the number at the left-hand side designates the lens surface numbers; r, the radius of curvature; d, the distance between less surfaces; N, the refractive index with respect to d-line (λ=587.6 nm); ν, Abbe number; X, diopter; m, magnification; ω, an angle of incidence; and h', the radius of pupil at an eye point, and a mark * attached to the right-hand side of the lens surface number represents an aspherical surface, f1: the focal length of the first lens in the objective lens, f2: the focal length of the second lens in the objective lens, f3: the focal length of the field lens, fw: the combined focal length of the first lens and second lens at the wide angle side, ft: the combined focal length of the first lens and second lens at the narrow angle side, r7: the paraxial radius of curvature of the aspherical surface of the ocular on the object side, r8: the radius of curvature of the ocular on the eye point (EP) side, S7: a distance along the optical axis from the contacting plane at the vertex of the aspherical surface on the aspherical surface of the ocular on the object side at a height, $y = 0.25 \cdot r7$, from the optical axis.

6. A Keplerian Zoom finder optical system according to claim 1, wherein said zoom finder optical system is structured in accordance with the data listed in the table given below:

$$X = -0.70D \quad m = 0.44 \sim 0.81x$$
$$2\omega = 46.9° \sim 24.1°$$
$$h' = 2.0$$

| | r | d | ν | N |
|---|---|---|---|---|
| 1) | −11.4410 | 1.200 | 35.09 | 1.574100 |
| 2) | 87.6421 | D1 | | 1.000000 |
| 3) | 12.5692 | 3.300 | 57.57 | 1.491080 |
| 4)* | −10.1352 | D2 | | 1.000000 |
| 5) | 12.0000 | 2.700 | 57.57 | 1.491080 |
| 6) | ∞ | 26.400 | | 1.000000 |
| 7)* | 19.2600 | 2.500 | 57.57 | 1.491080 |
| 8) | −43.0000 | 16.000 | | 1.000000 |
| 9)> | (EP) | | | 1.000000 |

Fourth surface (Aspherical surface)
Cone coefficient $K = -1.96$
Aspherical coefficient: $A8 = 3.4747 \times 10^{-7}$, $A10 = -1.2407 \times 10^{-8}$
Seventh surface (Aspherical surface)
Cone coefficient: $K = -0.40$
Aspherical coefficient: $A8 = -5.000 \times 10^{-10}$, $A10 = 0.0000$ (Variable spacing)

| m | 0.440 | 0.594 | 0.807 |
|---|---|---|---|
| D1 | 8.741 | 4.528 | 1.355 |
| D2 | 17.868 | 20.970 | 25.253 |

(1) $r1/r2 = -0.1305$
(2) $r3/r4 = -1.240$
(3) $S4/r4 = 0.03030$
(4) $\nu2 - \nu1 = 22.5$
(5) $|1 + f1/(fw \cdot ft)^{\frac{1}{2}}| = -1.000$
(6) $f1/fw = -1.354$
(7) $f3/f2 = 2.036$
(8) $r7/r8 = -0.448$
(9) $S7/r7 = 0.03105$ where, on the above-mentioned itemized table, the number at the left-hand side designates the less surface numbers; r, the radius of curvature; d, the distance between less surfaces; N, the refractive index with respect to d-line ($\lambda = 587.6$ nm); ν, Abbe number; X, diopter; m, magnification, ω, an angle of incidence; and h', the radius of pupil at an eye point and a mark * attached to the right-hand side of the lens surface number represents an aspherical surface, f1: the focal length of the first lens in the objective lens, f2: the focal length of the second lens in the objective lens, f3: the focal length of the field lens, fw: the combined focal length of the first lens and second lens at the wide angle side, ft: the combined focal length of the first lens and second lens at the narrow angle side, r7: the paraxial radius of curvature of the aspherical surface of the ocular on the object side, r8: the radius of curvature of the ocular on the eye point (EP) side, S7: a distance along the optical axis from the contacting plane at the vertex of the aspherical surface on the aspherical surface of the ocular on the object side at a height, $y = 0.25 \cdot r7$, from the optical axis.

7. A Keplerian Zoom finder optical system according to claim 1, wherein, said zoom finder optical system is structured in accordance with the data listed in the table given below:

$$X = -1.00D \quad m = 0.58 \sim 1.14x$$
$$2\omega = 43.1° \sim 20.9°$$
$$h' = 2.0$$

| | r | d | ν | N |
|---|---|---|---|---|
| 1) | −14.2300 | 1.400 | 35.09 | 1.574100 |
| 2) | 84.3669 | D1 | | 1.000000 |
| 3) | 15.3119 | 3.500 | 57.57 | 1.491080 |
| 4)* | −11.9950 | D2 | | 1.000000 |
| 5) | 15.0000 | 3.000 | 57.57 | 1.491080 |
| 6) | ∞ | 23.000 | | 1.000000 |
| 7)* | 19.0020 | 3.000 | 57.57 | 1.491080 |
| 8) | −30.0000 | 15.000 | | 1.000000 |
| 9)> | (EP) | | | 1.000000 |

Fourth surface (Aspherical surface)
Cone coefficient: $K = -1.78$
Aspherical coefficient: $A8 = 5.1555 \times 10^{-8}$, $A10 = -6.0409 \times 10^{-10}$
Seventh surface (Aspherical surface)
Cone coefficient: $K = -1.10$
Aspherical coefficient: $A8 = -4.000 \times 10^{-10}$, $A10 = 0.0000$ (Variable spacing)

| m | 0.584 | 0.813 | 1.142 |
|---|---|---|---|
| D1 | 11.060 | 5.420 | 1.284 |
| D2 | 21.068 | 25.087 | 30.857 |

(1) $r1/r2 = -0.1687$
(2) $r3/r4 = -1.277$
(3) $S4/r4 = 0.03040$
(4) $\nu2 - \nu1 = 22.5$
(5) $|1 + f1/(fw \cdot ft)^{\frac{1}{2}}| = -0.999$
(6) $f1/fw = -1.398$
(7) $f3/f2 = 2.136$
(8) $r7/r8 = -0.633$
(9) $S7/r7 = 0.03073$ where, on the above-mentioned itemized table, the number at the left-hand side designates the lens surface numbers; r, the radius of curvature; d, the distance between lens surfaces; N, the refractive index with respect to d-line ($\lambda = 587.6$ nm); ν, Abbe number; X, diopter; m, magnification; ω, an angle of incidence; and h', the radius of pupil at an eye point, and a mark * attached to the right-hand side of the lens surface number represents an aspherical surface, f1: the focal length of the first lens in the objective lens,
f2: the focal length of the second lens in the objective lens,
f3: the focal length of the field lens,
fw: the combined focal length of the first lens and second lens at the wide angle side,
ft: the combined focal length of the first lens and second lens at the narrow angle side,
r7: the paraxial radius of curvature of the aspherical surface of the ocular on the object side,
r8: the radius of curvature of the ocular on the eye point (EP) side,
S7: a distance along the optical axis from the contacting plane at the vertex of the aspherical surface on the aspherical surface of the ocular on the object side at a height, y=0.25·r7, from the optical axis.

8. A Keplerian Zoom finder optical system according to claim 1, wherein,
said zoom finder optical system is structured in accordance with the data listed in the table given below:

| | X = −1.00D | m = 0.52~0.96x | | |
| | 2ω = 46.6°~23.7° | | | |
| | h′ = 2.0 | | | |
|---|---|---|---|---|
| | r | d | ν | N |
| 1) | −13.5816 | 1.300 | 35.09 | 1.574100 |
| 2) | 82.1266 | D1 | | 1.000000 |
| 3) | 13.7483 | 3.300 | 57.57 | 1.491080 |
| 4)* | −11.9613 | D2 | | 1.000000 |
| 5) | 12.1020 | 2.900 | 57.57 | 1.491080 |
| 6) | ∞ | 1.500 | | 1.000000 |
| 7) | ∞ | 17.400 | 57.57 | 1.491080 |
| 8) | ∞ | 11.600 | | 1.000000 |
| 9)* | 20.4700 | 3.000 | 57.57 | 1.491080 |
| 10) | −29.0090 | 15.000 | | 1.000000 |
| 11> | (EP) | | | 1.000000 |

Fourth surface (Aspherical surface)
Cone coefficient: K = −2.41
Aspherical coefficient: A8 = −5.4379 × 10$^{-8}$,
A10 = 6.5121 × 10$^{-9}$
Ninth surface (Aspherical surface)
Cone coefficient: K = −1.30
Aspherical coefficient: A8 = −6.000 × 10$^{-10}$,
A10 = 0.0000

(Variable spacing)
| m | 0.522 | 0.708 | 0.963 |
| D1 | 9.951 | 5.090 | 1.482 |
| D2 | 18.790 | 22.357 | 27.242 |

(1) r1/r2 = −0.1654
(2) r3/r4 = −1.149
(3) S4/r4 = 0.03015
(4) ν2 − ν1 = 22.5
(5) |1 + f1/(fw·ft)$^{\frac{1}{2}}$| = −1.001
(6) f1/fw = −1.360
(7) f3/f2 = 1.812
(8) r7/r8 = −0.706
(9) S7/r7 = 0.03063 where,
on the above-mentioned itemized table, the number at the left-hand side designates the lens surface numbers; r, the radius of curvature; d, the distance between lens surfaces; N, the refractive index with respect to d-line (λ=587.6 nm); ν, Abbe number; X, diopter; m, magnification; ω, an angle of incidence; and h′, the radius of pupil at an eye point, and a mark * attached to the right-hand side of the lens surface number represents an aspherical surface,
f1: the focal length of the first lens in the objective lens,
f2: the focal length of the second lens in the objective lens,
f3: the focal length of the field lens,
fw: the combined focal length of the first lens and second lens at the wide angle side,
ft: the combined focal length of the first lens and second lens at the narrow angle side,
r7: the paraxial radius of curvature of the aspherical surface of the ocular on the object side,
r8: the radius of curvature of the ocular on the eye point (EP) side,
S7: a distance along the optical axis from the contacting plane at the vertex of the aspherical surface on the aspherical surface of the ocular on the object side at a height, y=0.25·r7, from the optical axis.

9. A Keplerian Zoom finder optical system according to claim 1, wherein
said zoom finer optical system is structured in accordance with the data listed in the table given below:

| | X = −0.70D | m = 0.48~0.88x | | |
| | 2ω = 40.7°~21.4° | | | |
| | h′ = 2.0 | | | |
|---|---|---|---|---|
| | r | d | ν | N |
| 1) | −12.90000 | 1.200 | 35.09 | 1.574100 |
| 2) | 70.3776 | D1 | | 1.000000 |
| 3) | 12.6255 | 3.600 | 57.57 | 1.491080 |
| 4)* | −11.2548 | D2 | | 1.000000 |
| 5) | 11.4000 | 2.700 | 57.57 | 1.491080 |
| 6) | ∞ | 25.800 | | 1.000000 |
| 7)* | 19.0180 | 2.300 | 57.57 | 1.491080 |
| 8) | −41.0030 | 16.000 | | 1.000000 |
| 9> | (EP) | | | 1.000000 |

Fourth surface (Aspherical surface)
Cone coefficient: K = −2.65
Aspherical coefficient: A8 = −1.4065 × 10$^{-7}$,
A10 = 1.7322 × 10$^{-8}$
Seventh surface (Aspherical surface)
Cone coefficient: K = −0.46
Aspherical coefficient: A8 = −5.000 × 10$^{-10}$,
A10 = 0.0000

(Variable spacing)
| m | 0.485 | 0.654 | 0.883 |
| D1 | 9.090 | 4.638 | 1.325 |
| D2 | 19.032 | 22.326 | 26.792 |

(1) r1/r2 = −0.1833
(2) r3/r4 = −1.122
(3) S4/r4 = 0.03005
(4) ν2 − ν1 = 22.5
(5) |1 + f1/(fw·ft)$^{\frac{1}{2}}$| = −1.000
(6) f1/fw = −1.350
(7) f3/f2 = 1.821
(8) r7/r8 = −0.464
(9) S7/r7 = 0.03102 where,
on the above-mentioned itemized table, the number at the left-hand side designates the lens surface numbers; r, the radius of curvature; d, the distance between lens surfaces; N, the refractive index with respect to d-line (λ=587.6 nm); ν, Abbe number; X, diopter; m, magnification; ω, an angle of incidence; and h′, the radius of pupil at an eye point, and a mark * attached to the right-hand side of the lens surface number represents an aspherical surface,
f1: the focal length of the first lens in the objective lens,
f2: the focal length of the second lens in the objective lens,
f3: the focal length of the field lens, fw: the combined focal length of the first lens and second lens at the wide angle side,
ft: the combined focal length of the first lens and second lens at the narrow angle side,
r7: the paraxial radius of curvature of the aspherical surface of the ocular on the object side,
r8: the radius of curvature of the ocular on the eye point (EP) side,
S7: a distance along the optical axis from the contacting plane at the vertex of the aspherical surface on the aspherical surface of the ocular on the object side at a height, y=0.25·r7, from the optical axis.

* * * * *